United States Patent [19]

Kozyra et al.

[11] Patent Number: 4,618,159
[45] Date of Patent: Oct. 21, 1986

[54] STEERING KNUCKLE ASSEMBLY

[75] Inventors: William L. Kozyra, Rochester; Andrew B. MacIsaac, Livonia; Vincent J. Santoro, East Detroit, all of Mich.

[73] Assignee: The Budd Company, Troy, Mich.

[21] Appl. No.: 670,983

[22] Filed: Nov. 13, 1984

[51] Int. Cl.$^4$ .............................................. B62D 7/18
[52] U.S. Cl. ..................................... 280/93; 180/253; 280/96.1
[58] Field of Search ................ 280/93, 95 R, 96, 96.1, 280/103; 180/253, 254

[56] References Cited

U.S. PATENT DOCUMENTS

| | | | |
|---|---|---|---|
| 2,435,814 | 2/1948 | Allison | 280/96.1 |
| 3,758,129 | 9/1973 | Ishikawa et al. | 280/96.1 |
| 3,865,394 | 2/1975 | Epner et al. | 280/96.1 |
| 3,940,159 | 2/1976 | Pringle | 280/96.1 |
| 4,271,922 | 6/1981 | Kishline | 180/254 |
| 4,282,949 | 8/1981 | Kopich et al. | 180/252 |
| 4,377,298 | 3/1983 | Finn et al. | 280/66.3 |

FOREIGN PATENT DOCUMENTS 829419  6/1938  France ................. 280/96.1

Primary Examiner—John J. Love
Assistant Examiner—Kenneth R. Rice
Attorney, Agent, or Firm—Harness, Dickey & Pierce

[57] ABSTRACT

An improved steering knuckle assembly is described which is made by combining a bearing carrier component preferably formed by casting or forging processes to a steering knuckle housing preferably made from stamped sheet metal. This composite structure replaces existing integral cast or forged units. By replacing a portion of a conventional cast or forge steering knuckle with stamped sheet metal components, significant weight savings are achieved. Further, production tooling costs are further reduced due to the comparable cost advantage of metal stamping tools versus casting, forging, and machining tooling. In addition to a cartridge wheel bearing assembly within the steering knuckle assembly, a redundant bearing mounting is provided when this mechanical trapping is coupled with an interference fit between the bearing carrier internal bore and the cartridge wheel bearing assembly. The stamped steering knuckle housing has several suspension fastening bushings, welded or otherwise, attached thereto. The structural integrity of the mounting between the suspension fastening sockets and the stamped steering knuckle housing is enhanced by providing inner reinforcing plates which are also attached to the suspension fastening bushings. Since a major portion of the steering knuckle assembly according to this invention is stamped, it is possible to use many carry over components for various motor vehicle designs simply by changing the configuration and design of the stamped steering knuckle housing.

30 Claims, 3 Drawing Figures

STEERING KNUCKLE ASSEMBLY

BACKGROUND AND SUMMARY OF THE INVENTION

This invention relates to motor vehicle suspension components and particularly, to a steering knuckle assembly adapted to support a front axle.

Conventional steering knuckles are typically constructed as one-piece forged or cast units. These integral units provide a wheel bearing carrier, torque arms for supporting a disc type brake caliper, and points of attachment for suspension joints. Although these steering knuckles perform satisfactorily, it is desirable to provide enhanced structural and cost optimization of the steering knuckle assembly structure design. It is particularly desirable to reduce the weight of the steering knuckle assembly since weight reductions in this area provide the advantages of reducing both total vehicle weight and suspension unsprung mass. Overall weight reductions improve performance and fuel efficiency. Reductions in unsprung mass are desired since they are capable of providing significant improvements in vehicle ride and handling. It is a further objective to provide an improved steering knuckle assembly which can be produced at a lower cost than current designs. It is additionally desirable to provide an improved steering knuckle assembly which is adaptable to different motor vehicle applications. Another advantgeous feature is the provision of positive mechanical retention of a wheel bearing assembly within the steering knuckle assembly.

The above desirable improvements in a steering knuckle assembly are provided by this invention. In accordance with the preferred embodiment of this invention, a steering knuckle assembly is described which is formed from two mechanically attached components. A bearing carrier is preferably produced by conventional casting or forging processes and includes the wheel bearing carrier and torque reaction arms for mounting a disc brake caliper assembly. The remaining portion of the steering knuckle assembly is formed by a concave shell-shaped housing preferably manufactured using metal stamping processes. The stamped sheet metal housing may be reinforced with one or more internally disposed plates. Mounting bushings for suspension components such as ball joints, struts and steering links are installed and preferably welded to the stamped housing and reinforcing plates. This composite structure provides a significant weight advantage as compared with conventional designs primarily due to the use of stamped components. Use of such components further reduces total cost due to the relative cost advantage of tooling for stamped metal parts as compared to that for casting and machining operations. The steering knuckle assembly according to this invention is easily adapted to different motor vehicle applications merely by changing the configuration of the stamped housing, enabling the same cast or forged bearing carrier component to be used for various applications. As assembled, the steering knuckle assembly according to a preferred embodiment of this invention mechanically traps the wheel bearing assembly within the steering knuckle. Prior art steering knuckle constructions conventionally employ only interference or press fit engagement of these components. The means for retaining the wheel bearing assembly within the steering knuckle assembly according to this invention is therefore more secure and reliable than that provided by prior art designs.

Additional benefits and advantages of the present invention will become apparent to those skilled in the art to which this invention relates from the subsequent description of the preferred embodiments and the appended claims, taken in conjunction with the accompanying drawings.

DETAILED DESCRIPTION OF THE INVENTION

Figure 1:
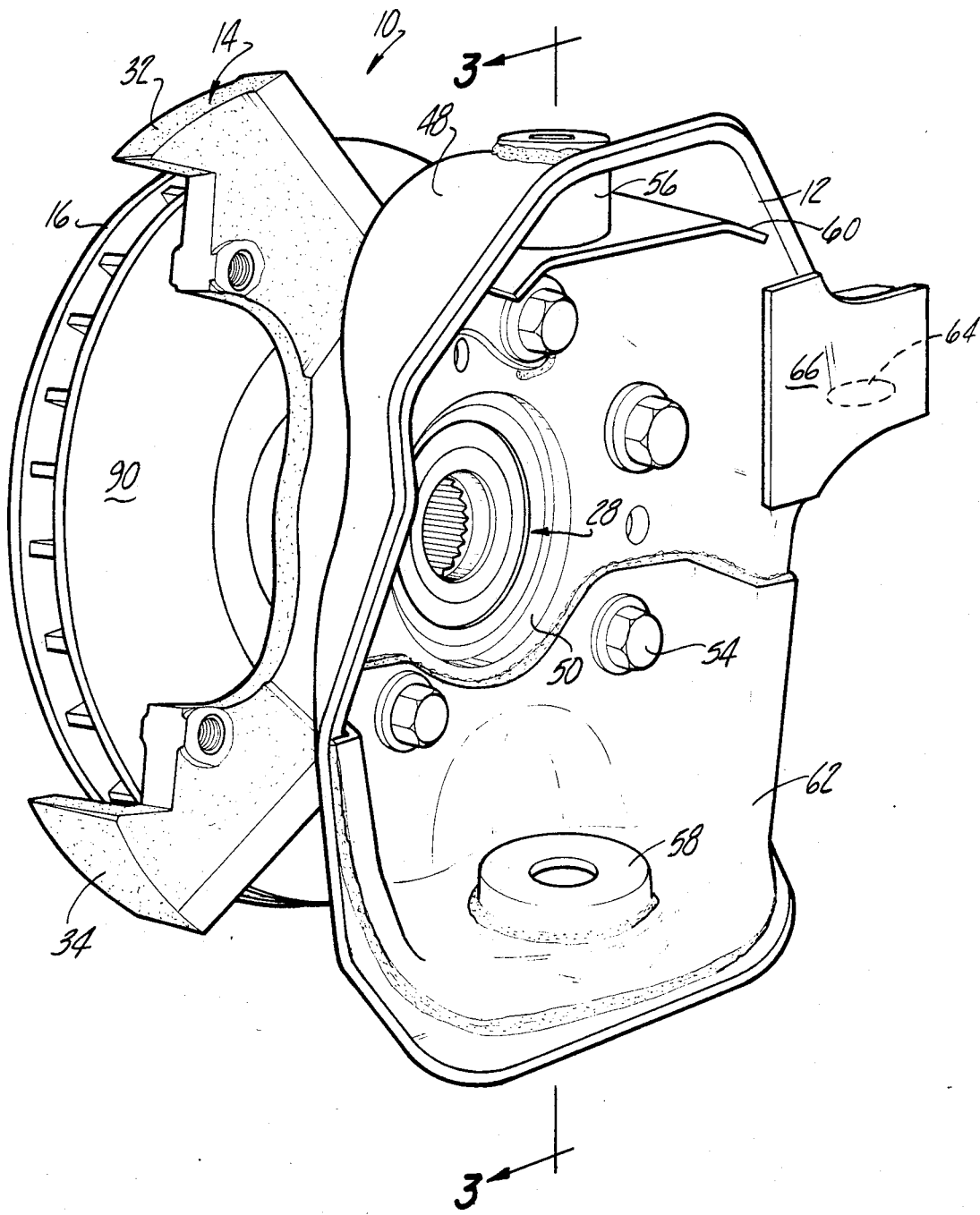
FIG. 1 is a perspective view of a steering knuckle assembly in accordance with this invention shown from an inboard viewing position and shown with associated components including a cartridge-type wheel bearing, a disc brake rotor, and a drive hub.

A steering knuckle assembly in accordance with this invention is shown in the drawings and is generally designated by reference character 10. The primary components of steering knuckle assembly 10 are knuckle housing 12 and bearing carrier 14. Steering knuckle assembly 10 is designed to rotatably mount disc brake rotor 16 and hub 20, and provide a mount for disc brake caliper assembly 18, which is made of caliper 22 and shoes 24. Steering knuckle assembly 10 further provides mounting points for various suspension components, such as ball joints 38 and 40, and steering link 42. Alternately, knuckle assembly 10 could be configured to accept other types of suspension components such as strut type suspension units, etc. Steering knuckle assembly 10 described and illustrated herein is intended for use with a driven axle. The novel features of this invention, however, are also applicable to non-driven axle configurations.

Bearing carrier 14 is preferably made by a casting or forging process. Bearing carrier 14 includes an axially elongated internal bore 26 which is dimensioned to accept cartridge wheel bearing assembly 28. Preferably, the diameter dimensions are chosen to provide slight interference between bore 26 and wheel bearing assembly 28 thereby providing "press fit"0 installation of the bearing. Although such installation is not necessary to fasten wheel bearing 28 within knuckle assembly 10 if the mechanical trapping feature described below is employed, a press fit is desirable to avoid rattling and provide accurate bearing alignment. Bore 26 terminates at its outboard end in a radially inward ridge which forms shoulder 30. The diameter of shoulder 30 is significantly less than the outer diameter of bearing assembly 28, so that the shoulder acts as an abutment to axially retain the wheel bearing from being withdrawn from bearing carrier 14. Bearing carrier 14 further includes an integrally formed pair of radially extending and angularly offset torque arms 32 and 34. Torque arms 32 and 34 are configured to accept disc brake caliper 22 and disc brake shoes 24. Torque arms 32 and 34 provide reaction points enabling caliper assembly 18 to exert a frictional retarding force upon disc brake rotor 16. Bearing carrier 14 further forms a radially extending flange 36 having a plurality of threaded bores 44 therethrough. Threaded bores 44 are radially spaced to encircle bore 26.

Steering knuckle housing 12 is preferably formed from sheet metal stock. Housing 12 could be formed by a progressive die metal stamping process wherein parts are moved from one work station to the next as they are formed from metal blanks to finished parts. Since housing 12 requires a considerable degree of deformation of the metal, mild steel is a preferred material. Housing 12 is formed in the shape of a concave shell and includes a generally flat center surface 46, and a peripheral edge flange portion 48 extending generally transverse from the center surface. Within center surface 46 is central aperture 50. Aperture 50 preferably has a diameter or a cross-sectional dimension smaller than the outer diameter of cartridge wheel bearing assembly 28. This configuration provides another abutment for mechanically trapping cartridge wheel bearing assembly 28 within bearing carrier 14. Radially spaced around aperture 50 are a plurality of fastener bores 52 which are positioned for registry with threaded bores 44. A plurality of threaded fasteners 54 pass through fastener bores 52 and threadingly engage threaded bores 44 to thereby clampingly interconnect steering knuckle housing 12 to bearing carrier 14.

It is necessary during assembly of knuckle housing 12 to bearing carrier 14 to insure the desired relative angular relationship between these components. Therefore, it is desirable to provide means for preventing assembly unless the components are properly oriented. This feature is accomplished for the embodiment shown in the drawings by unevenly radially spacing bores 44 and 52 so that they become aligned only when the desired relationship exists. Other possible approaches include keying the parts together such that the parts interengage only in the desired assembled part position.

Additional fasteners 102 are provided which are threaded into bores 106 of bearing carrier 14. Fasteners 102 enable the attachment of a conventional splash shield (not shown) which aids in protecting the inboard surface of disc brake rotor 16 from contamination. Fasteners 102 further preferably include a rounded nose 108 which fits within bore 104 of knuckle housing 12. The bores 106 and 104 are preferably spaced to provide the alignment only when the components are properly assembled, as discussed above.

Typically, suspension components which are attached to steering knuckle assembly 10 include tapered shaft portions, which are inserted within correspondingly tapered bores of the knuckle. Threaded fasteners are used to tightly engage the tapered shaft within the tapered bore. In order to accommodate such fastening methods, several suspension mounting bushings 56, 58 and 64 are employed which are welded or otherwise connected to housing 12. These bushings include an internal tapered bore which corresponds to the taper of the associated suspension component. Typically, upper and lower suspension ball joints 38 and 40 are attached to the steering knuckle at points on a vertical or nearly vertical axis. Such positioning enables steering rotation of the associated wheel about that axis. In order to enhance the strength of engagement between bushings 56 and 58, and knuckle housing 12, it is further desirable to install upper and lower ball joint bushing reinforcing plates 60 and 62 respectively, which are welded or otherwise attached to the inside surface of steering knuckle housing 12. Preferably, flange 48 and the reinforcing plates are welded to bushings 56 and 58 at axially spaced positions to enhance the structural integrity of the fastening of these components. In order to provide additional reinforcing of the knuckle housing 12 structure, reinforcing plates 60 and 62 may be extended radially inward toward central bore 50 and further may be provided with bores which are collinear with bores 52. This configuration enables threaded fasteners 54 to clampingly engage the reinforcing plates.

Figure 2:
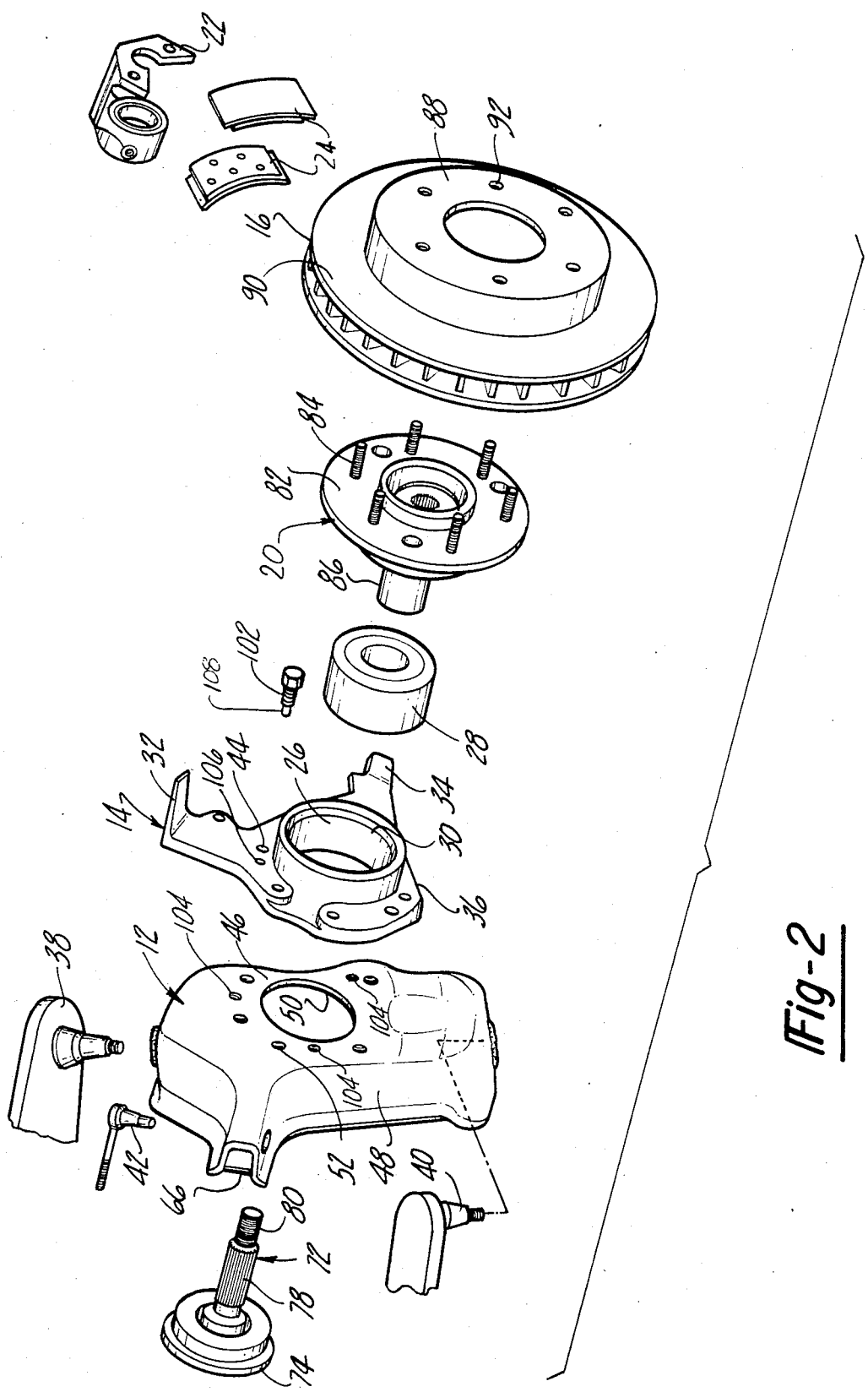
FIG. 2 is an exploded perspective view of the steering knuckle assembly according to this invention showing the components thereof in unassembled positions and further showing associated components including a hub, disc brake rotor, brake caliper, and several suspension components.
Figure 3:
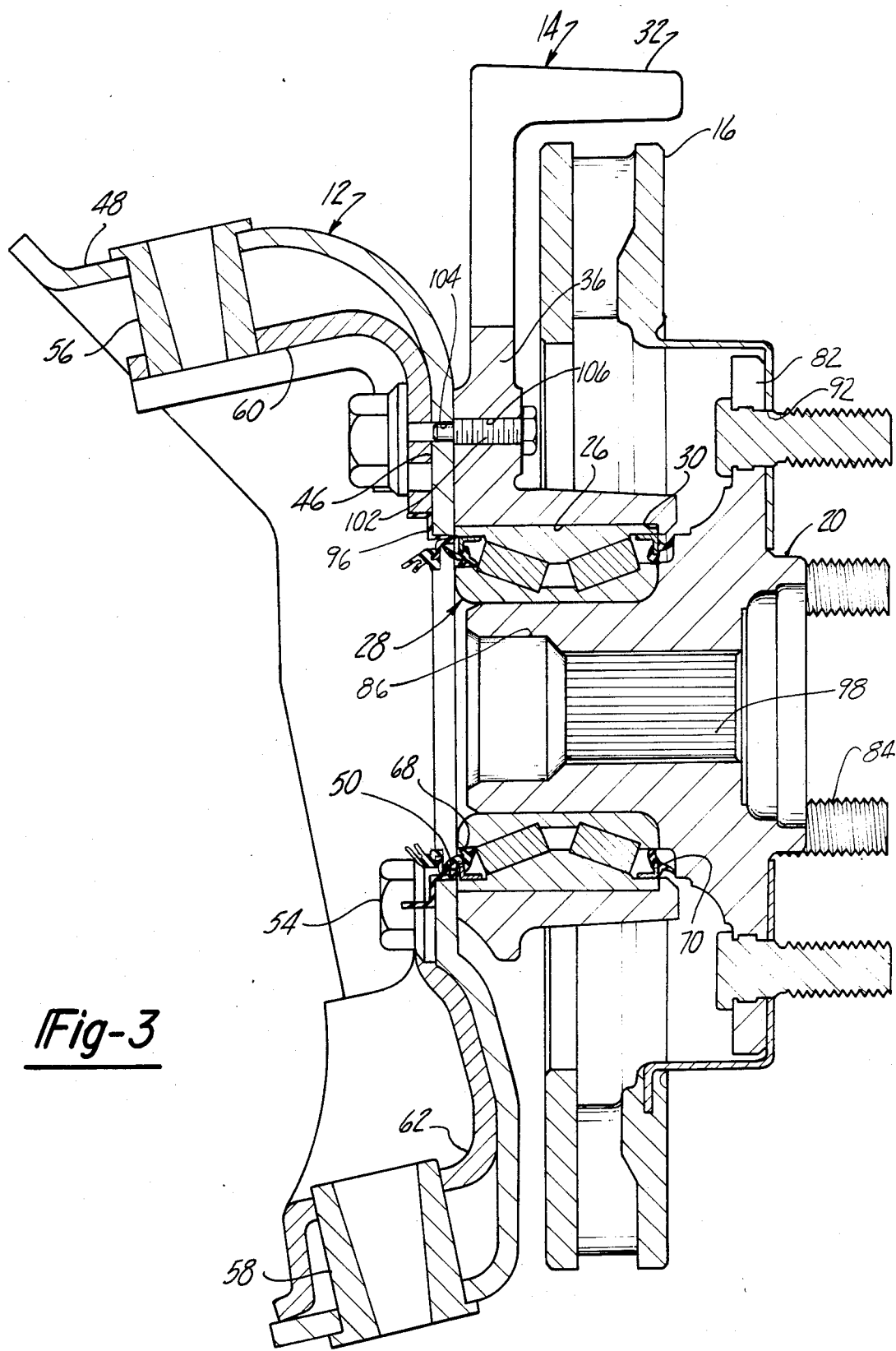
FIG. 3 is a cross-sectional view taken along line 3—3 of FIG. 1 showing the various components of the steering knuckle assembly with associated suspension components.

Motor vehicle steering is provided by movement of steering link 42 which causes knuckle assembly 10 and the attached wheel to pivot about a vertical axis. In order to achieve steering movement, it is necessary to mount a steering link attaching point a radial distance from the axis extending between upper and lower ball joint bushings 56 and 58. A mounting location for steering link 42 is provided by forming peripheral edge flange 48 so that it becomes pinched together thereby forming spaced apart generally parallel surfaces, as best shown in FIGS. 1 and 2. Steering link bushing 64 is installed between these surfaces of flange 48, and bores are provided therethrough to enable attachment of steering link 42. Additional reinforcement of knuckle housing 12 near the point of attachment of steering link bushing 64 is provided by steering link bushing reinforcing plate 66 which is welded to flange 48 near bushing 64.

Wheel bearing assembly 28, preferably employed in connection with steering knuckle assembly 10, is a cartridge-type bearing assembly. These types of bearing assemblies are integral units which have permanently assembled inner and outer races. Wheel bearing assembly 28 is sealed from the environment by inner and outer bearing seals 68 and 70. Preferably, seals 68 and 70 are identical, thereby enabling reversible installation of bearing 28. An additional seal 96 is preferably provided which is press fit into knuckle housing aperture 50. Seal 96 includes sealing lips which make sliding contact with drive shaft 72 thereby further acting to prevent contamination of wheel bearing assembly 28. Seals 68 and 70 preferably sealingly contact seal 96 and hub 20 respectively. Drive shaft 72 typically would include one or two constant velocity type universal joints 74. Universal joints 74 permit a degree of relative angular disalignment between portions of drive shaft 72, enabling suspension travel without damaging the drive shaft. Drive shaft 72 further forms an extending splined shaft 78 having a threaded end 80. Hub 20 forms an internal splined surface which corresponds and mates with the splines of shaft 78. Hub 20 further forms a radially extending flange 82 which provides a mounting location for a plurality of wheel mounting studs 84. Hub 20 has a cylindrical surface or nose 86 which preferably frictionally engages the inner race of cartridge wheel bearing assembly 28 when these parts are assembled.

Disc brake rotor 16 may be a conventional integral unit or preferably a composite type having a stamped sheet metal inner hub 88 with an outer cast rotor surface 90. The composite configuration of rotor 16 provides a more mass efficient unit. Hub 88 includes a plurality of radially spaced bores 92 which receive wheel mounting studs 84.

The assembly and operation of steering knuckle assembly 10 will now be described in detail. The assembly of the various components is best explained with particular reference to the exploded pictorial view of FIG. 2. During initial assembly, cartridge bearing assembly 28 is pressfit within bore 26 of bearing carrier 14. Due to the presence of shoulder 30, it is necessary to load and press cartridge wheel bearing assembly 28 from the inboard side of bearing carrier 14. Bearing assembly 28 is depressed within bore 26 until it engages shoulder 30 which prevents further displacement.

Steering knuckle housing 12, having reinforcing plates 60, 62 and 66 welded thereto, is loaded into position such that fastening bores 52 are aligned with threaded bores 44. Thereafter, threaded fasteners 54 are threadably installed, thereby fixing these two components. Since central aperture 50 preferably has a radial dimension smaller than the diameter of the outer race of cartridge wheel bearing 28, the bearing becomes trapped between abutments formed by steering knuckle housing 12 and shoulder 30 of bearing carrier 14. Bearing 28 is therefore retained within steering knuckle assembly 10 both by press fit and mechanical trapping engagement. This fastening approach provides more secure engagement of wheel bearing assembly 28 than according to prior art designs wherein a press fit is the only mechanism used to secure the wheel bearing. Seal 96 is press fit into aperture 50 of housing 12. Hub 20 is preferably press fit into the inner race of cartridge bearing assembly 28. The entire assembly becomes mounted to the motor vehicle by threadingly attaching ball joints 38 and 40, and steering link 42 to the associated bushings attached to steering knuckle housing 12. Drive shaft 72 is installed such that splined portion 78 thereof passes through and engages within a correspondingly splined internal bore of hub 20. Finally, rotor 16, caliper 22 and brake shoes 24 are installed.

While the above description constitutes the preferred embodiments of the present invention, it will be appreciated that the invention is susceptible to modification, variation and change without departing from the proper scope and fair meaning of the accompanying claims.

What is claimed is:

1. The steering knuckle assembly for a vehicle wherein said steering knuckle assembly is adapted for use with a driven wheel comprising:
    a steering knuckle housing in the from of a generally concave shell, said shell having a generally flat major face and including peripheral edge flange portions extending generally transversely to the major face; and means formed in at least one of said flange portions providing a mounting location for suspension components of said vehicle;
    an aperture formed in the major face of said shell through which said driven axle extends;
    a bearing carrier member having a flange portion and a transversely extending internal bore, said bearing carrier member further includes a pair of integrally formed torque arms to which a brake caliper assembly can be mounted whereby said member serves as a torque plate thereof;
    a hub having a radially extending flange and a generally radially extending flange portion having means therein for engaging said axle, and
    bearing means mounted in said bearing carrier bore for providing rotatable engagement with said hub.

2. The steering knuckle assembly according to claim 1 wherein an end of said bearing carrier bore opposite said shell includes a radially inwardly directed lip providing an abutment surface for said bearing means; and wherein said shell aperture has a radial dimension smaller than the diameter of said bearing means, said shell providing another abutment surface for an opposite end of said bearing means which is clamped between said two abutment surfaces when said bearing carrier member is fastened to said shell.

3. The steering knuckle assembly according to claim 1 wherein said means providing a mounting location for suspension components comprises at least one bushing for a shaft of a suspension component and a portion of said bushing being connected to said peripheral edge flange of said shell, and
    at least one reinforcing plate member disposed within the concave side of said shell connected to said shell, said reinforcing plate member having a portion being spaced from said shell such that said reinforcing plate and said shell join said bushing at opposing ends thereof.

4. A steering knuckle assembly according to claim 1 wherein said means for fastening said bearing carrier to said knuckle housing comprises, said bearing carrier having a plurality of threaded bores within said radial flange spaced radially around said internal bore, said knuckle housing having a plurality of fastener bores in registry with said threaded bores, and a plurality of fasteners which pass through said fastener bores and threadingly engage said threaded bores thereby clampingly attaching said knuckle housing to said bearing carrier.

5. A steering knuckle assembly according to claim 4 wherein said knuckle housing and said bearing carrier includes means to insure a predetermined orientation between these components when they are assembled.

6. A steering knuckle assembly according to claim 5 wherein said means comprises unequally radially spacing said threaded bores and said fastener bores whereby said bores are in registry only when said predetermined orientation is achieved.

7. A steering knuckle assembly according to claim 1 wherein said bearing carrier internal bore is dimensioned to provide press fit installation of said wheel bearing.

8. A steering knuckle assembly according to claim 1 adapted to provide a mounting for upper and lower suspension ball joints and wherein said means for attaching said suspension components and said steering link to said knuckle housing comprises:
    an upper ball joint bushing affixed to said knuckle housing flange,
    a lower ball joint bushing affixed to said knuckle housing flange, and
    a steering link bushing affixed to said knuckle housing flange, said bushings having internal bores adapted for engagement with said upper and lower ball joints and said steering link.

9. A steering knuckle assembly according to claim 8 wherein said bushings have tapered internal bores.

10. A steering knuckle assembly according to claim 8 further comprising:
    an upper ball joint bushing reinforcing plate having a bore which receives said upper ball joint bushing, said upper ball joint bushing being welded to said knuckle housing and said upper ball joint bushing reinforcing plate, said upper ball joint bushing reinforcement plate being separated from said steering knuckle such that said upper ball joint bushing reinforcement plate and said steering knuckle engage said upper ball joint bushing at opposite ends thereof.

11. A steering knuckle assembly according to claim 10 wherein said upper ball joint bushing reinforcing plate further includes one or more bores corresponding with one or more of said knuckle housing fastener bores whereby one or more of said threaded fasteners engages said upper ball joint bushing reinforcing plate.

12. A steering knuckle assembly according to claim 8 further comprising:

a lower ball joint bushing reinforcing plate having a bore which receives and lower ball joint bushing, said lower ball joint bushing being welded to said knuckle housing and said lower ball joint bushing reinforcing plate, said lower ball joint bushing reinforcement plate being separated from said steering knuckle such that said lower ball joint bushing reinforcement plate and said steering knuckle engage said lower ball joint bushing at opposite ends thereof.

13. A steering knuckle assembly according to claim 12 wherein said lower ball joint bushing reinforcing plate further includes one or more bores corresponding with one or more of said knuckle housing fastener bores whereby one or more of said threaded fasteners engages said lower ball joint bushing reinforcing plate.

14. A steering knuckle assembly according to claim 8 wherein said knuckle housing edge flange is pinched together to form a pair of generally parallel surfaces, said surfaces spaced apart to mount said steering link bushing therebetween.

15. A steering knuckle assembly according to claim 14 further comprising;

a steering link bushing reinforcing plate attached to said housing edge flange adjacent said steering link bushing.

16. A steering knuckle assembly according to claim 15 wherein said steering link bushing reinforcement plate further includes one or more bores corresponding with one or more of said knuckle housing fastener bores whereby one or more of said threaded fasteners engages said steering link bushing reinforcing plate.

17. A steering knuckle assembly for a motor vehicle, said steering knuckle assembly adapted to provide a mounting for a disc brake caliper assembly, a wheel bearing, suspension components and a steering link, said steering knuckle comprising;

a bearing carrier having an internal bore adapted to receive said wheel bearing, said internal bore having a radially inwardly directed shoulder, a radial flange and a pair of torque arms adapted to engage said disc brake assembly, a knuckle housing having an aperture bore therein, said aperture having a radial dimension less than the diameter of said wheel bearing, said housing further having means for attaching said upper and lower ball joints and said steering link to said housing, and means for fastening said bearing carrier to said knuckle housing whereby upon fastening, said wheel bearing becomes trapped within said internal bore between abutments formed by said shoulder and said knuckle housing.

18. A steering knuckle assembly according to claim 17 wherein said means for fastening said bearing carrier to said knuckle housing comprises, said bearing carrier having a plurality of threaded bores within said radial flange spaced radially around said internal bore, said knuckle housing having a plurality of fastener bores in registry with said threaded bores, and a plurality of fasteners which pass through said fastener bores and threadingly engage said threaded bores thereby clampingly attaching said knuckle housing to said bearing carrier.

19. A steering knuckle assembly according to claim 18 wherein said knuckle housing and said bearing carrier includes means to insure a predetermined orientation between these components when they are assembled.

20. A steering knuckle assembly according to claim 19 wherein said means comprises unequally radially spacing said threaded bores and said fastener bores whereby said threaded bores and fastener bores are in registry only when said predetermined orientation exists.

21. A steering knuckle assembly according to claim 17 wherein said bearing carrier internal bore is dimensioned to provide press fit installation of said wheel bearing.

22. A steering knuckle assembly according to claim 17 adapted to provide a mounting for upper and lower suspension ball joints and wherein said means for attaching said suspension components and said steering link to said knuckle housing comprises:

an upper ball joint bushing affixed to said knuckle housing flange, a lower ball joint bushing affixed to said knuckle housing flange, and a steering link bushing affixed to said knuckle housing flange, said bushings having internal bores adapted for engagement with said upper and lower ball joints and said steering link.

23. A steering knuckle assembly according to claim 22 wherein said bushing internal bores are tapered.

24. A steering knuckle assembly according to claim 22 further comprising:

an upper ball joint bushing reinforcing plate having a bore which receives said upper joint bushing, said upper ball joint bushing being welded to said knuckle housing and said upper ball joint bushing reinforcing plate, said upper ball joint bushing reinforcement plate being separated from said steering knuckle such that said upper ball joint bushing reinforcement plate and said steering knuckle engage said upper ball joint bushing at opposite ends thereof.

25. A steering knuckle assembly according to claim 24 wherein said upper ball joint bushing reinforcing plate further includes one or more bores corresponding with one or more of said knuckle housing fastener bores whereby one or more of said threaded fasteners engages said upper ball joint-bushing reinforcing plate.

26. A steering knuckle assembly according to claim 22 further comprising;

a lower ball joint bushing reinforcing plate having a bore which receives said lower joint bushing, said lower ball joint bushing being welded to said knuckle housing and said lower ball joint bushing reinforcing plate, said lower ball joint bushing reinforcement plate being separated from said steering knuckle such that said lower ball joint reinforcement plate and said steering knuckle join said lower ball joint bushing at opposite ends thereof.

27. A steering knuckle assembly according to claim 26 wherein said lower ball joint bushing reinforcing plate further includes one or more bores corresponding with one or more of said knuckle housing fastener bores whereby one or more of said threaded fasteners engages said lower ball joint-bushing reinforcing plate.

28. A steering knuckle assembly according to claim 22 wherein said knuckle housing edge flange is pinched together to form a pair of generally parallel surfaces, said surfaces spaced apart to mount said steering link bushing therebetween.

29. A steering knuckle assembly according to claim 28 further comprising:
a steering link bushing reinforcing plate attached to said housing edge flange adjacent said steering link bushing.

30. A steering knuckle assembly according to claim 29 wherein said steering link bushing reinforcement plate further includes one or more bores corresponding with one or more of said knuckle housing fastener bores whereby one or more of said threaded fasteners engages said steering link bushing reinforcing plate.

* * * * *